United States Patent [19]

Layne

[11] Patent Number: 4,711,059
[45] Date of Patent: Dec. 8, 1987

[54] DOCK SEAL WITH LIP FOR SEALING DOOR HINGE GAP

[75] Inventor: Richard C. Layne, Columbus, Ohio

[73] Assignee: Gladys M. Sahr, Columbus, Ohio

[21] Appl. No.: 710,490

[22] Filed: Mar. 11, 1985

[51] Int. Cl.⁴ .......................................... E04H 14/00
[52] U.S. Cl. ............................ 52/173 DS; 14/71.5
[58] Field of Search .......... 52/173 DS; 49/493, 495, 49/496, 485; 14/71.5, 71.3

[56] References Cited

U.S. PATENT DOCUMENTS

| | | | |
|---|---|---|---|
| 3,500,599 | 10/1967 | Sciolino | 52/173 DS |
| 3,875,954 | 4/1975 | Frommelt et al. | 52/173 DS |
| 4,213,279 | 7/1980 | Layne | 52/173 DS |
| 4,328,273 | 5/1982 | Yackin | 49/496 |
| 4,638,612 | 1/1987 | Bennett | 52/173 DS |

FOREIGN PATENT DOCUMENTS

| | | |
|---|---|---|
| 1922023 | 4/1969 | Fed. Rep. of Germany ... 52/173 DS |
| 2436518 | 8/1975 | Fed. Rep. of Germany ... 52/173 DS |

*Primary Examiner*—William F. Pate, III
*Assistant Examiner*—Richard E. Chilcot, Jr.
*Attorney, Agent, or Firm*—Frank H. Foster

[57] ABSTRACT

An improvement in a dock seal of the type in which a movable panel in its disengaged position extends generally from the side of the dock opening toward the center of the dock opening and when engaged by the exterior of a truck is moved backwardly by the truck. The improvement is a lip panel which is attached to and runs along the inner edge of the movable panel and when not engaged by the truck extends generally away from the dock opening. The lip panel seats against a truck when the dock seal is engaged by a backing truck and moved toward the dock opening with the truck into sealing engagement of the gap between an open truck door and the truck body.

8 Claims, 6 Drawing Figures 4,711,059

DOCK SEAL WITH LIP FOR SEALING DOOR HINGE GAP

TECHNICAL FIELD

This invention relates generally to apparatus for providing a seal between a vehicle, such as a truck, and the dock opening of a building through which goods are loaded and unloaded to and from the truck and more particularly this invention relates to a dock seal which not only seals truck trailers of varying widths, but has means for sealing the door hinge gaps between each rear cargo the door and the truck or trailer body.

BACKGROUND ART

A major portion of the commerce in the industrialized world involves the shipment and storage of goods. A large majority of these goods are shipped by trucks, especially of the van or semi-trailer type, which have open rear doors. In order to load and unload goods to and from such trucks, they are commonly backed against a doorway opening constructed in a warehouse or other building to form a loading dock. It is common and desirable to provide a dock seal which is mounted around the opening which forms a loading dock. The dock seal provides a weather barrier so that the goods may be protected, the workers will not be exposed to weather and the heated or air conditioned air within the building will not be lost.

A substantial variety of such dock seals of various constructions have been proposed in the past for providing a suitable seal. Recently, the adoption of newer, wider body truck trailers has meant that a dock seal must be capable of sealing trucks of different widths. As a result, the L-shaped seal, which I invented and which is illustrated in my U.S. Pat. No. 4,213,279, has become popular because of its sealing effectiveness in dealing with different sized truck bodies.

I have discovered, however, that a problem exists when the L-shaped seal is used with trucks of the type having two hinged doors each closing half of the rear opening of the trailer. These doors pivot from their closed position around to a full opened position at the sides of the trailer. The problem is that a hinge gap exists between the door and the trailer body when the door is open. The L-shaped seal effectively wipes and seals the sides of the truck, as described in my patent, by wiping against the outwardly facing interior side of the doors, but does not seal this hinge gap.

In the past when standard trailers of uniform width were in use, the problem was non-existent when the old compression seals were used against which the truck backs to compress the seal against the wall of the building. Although a compression seal avoids the problem for a uniform width trailer, dock openings are now constructed wider in order to accomodate the wider body trucks. A compression type dock seal would need to extend inwardly from the sides of the opening to accomodate the narrower trucks. As a result, a compression seal which could accomodate both wide and narrow trucks would block a portion of the newer, wider dock openings.

It is also important that a dock seal which seals the hinge gap of either wide or narrow trucks never extends significantly inwardly of the truck opening. If it does, in use it will be occasionally struck and torn by loading and unloading equipment, and will therefore be in need of frequent, periodic repair.

There is therefore a need for a structure for sealing the hinge gap of truck doors which will provide an effective seal for truck bodies of wide or standard widths, yet which will not be subject to damage in the ordinary course of use of the loading dock. It is a further object of the invention to provide a dock seal with a hinge gap sealing structure which will operate effectively for multi-width truck bodies even though the truck may not be backed squarely against the dock.

BRIEF DISCLOSURE OF INVENTION

The invention is an improved dock seal of the type having a movable panel, such as formed by the legs of an L-shaped dock seal, which extends in its disengaged position generally toward the center of the dock opening and is movable back toward the dock opening upon engagement by the exterior of the truck. The improvement in the dock seal is a lip panel attached near and running along the inner or central facing edge of the movable panel and extending, when not engaged by the truck, generally away from the dock opening. This lip seals the space between an open truck door and the truck body as the movable panel is moved toward the dock opening when engaged by a backing truck.

Figure 1:
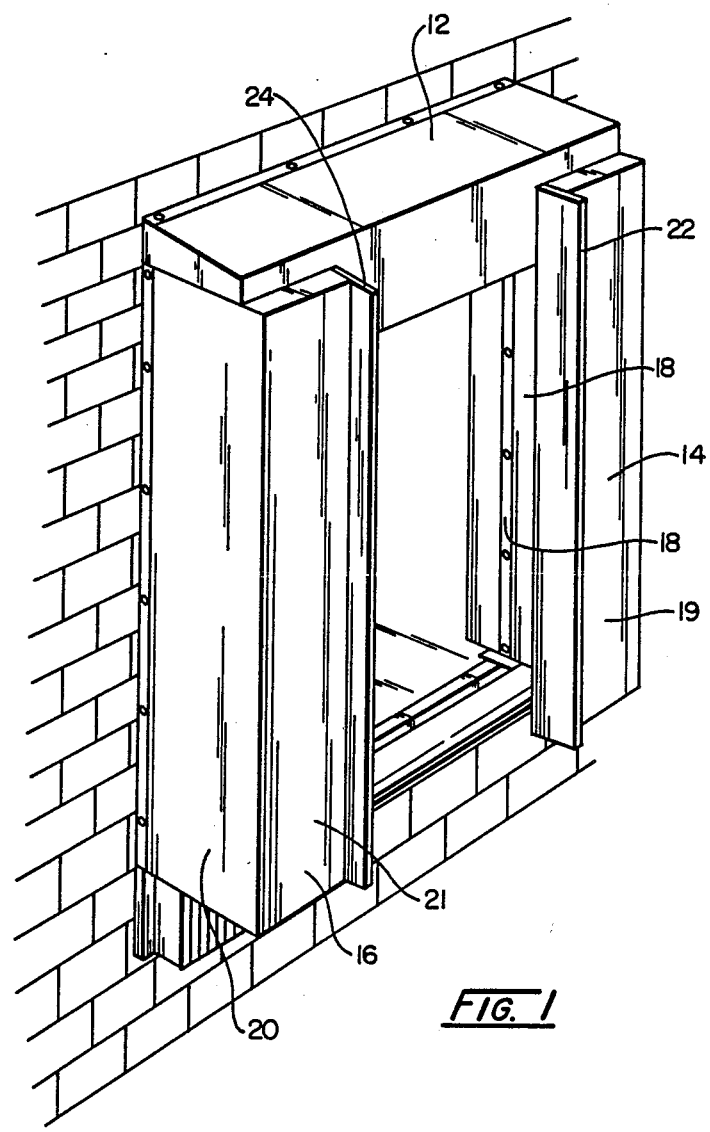
FIG. 1 is a view in perspective of a dock opening having a dock seal embodying the improvements of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Referring to FIG. 1, an improved dock seal is illustrated for sealing between a dock opening 10 and a truck. The seal has a header 12 for sealing the top of the truck which can be either of L-shaped design or of a more conventional design. It includes a movable panel 14 which, when not engaged by a truck, is positioned to extend generally toward the center of the dock opening. A similar movable panel 16 is symmetrically positioned on the opposite side of the dock opening 10.

The preferred seal is an L-shaped seal in which the movable panel is flexible and has two legs. One leg 18 extends outwardly, generally perpendicularly of the opening and the second leg, 19, extends from the outer end of the first leg 18, generally parallel to the plane of the door opening and toward its center. Similarly, on the opposite side of the dock opening, the first leg 20 extends generally perpendicularly to the door opening and at its outer end it is attached to a second leg 21 extending generally parallel to the plane of the door opening and generally toward its center.

A lip panel 22 is attached near and runs along the inner edge of the movable panel 14. A similar, symetrically opposite lip panel 24 is attached near and runs along the inner edge of the opposite movable panel 16. In the position of the dock seal when it is not engaged by a truck, these lip panels extend generally away from the dock opening, preferably perpendicularly to the plane of that dock opening.

Figure 2:
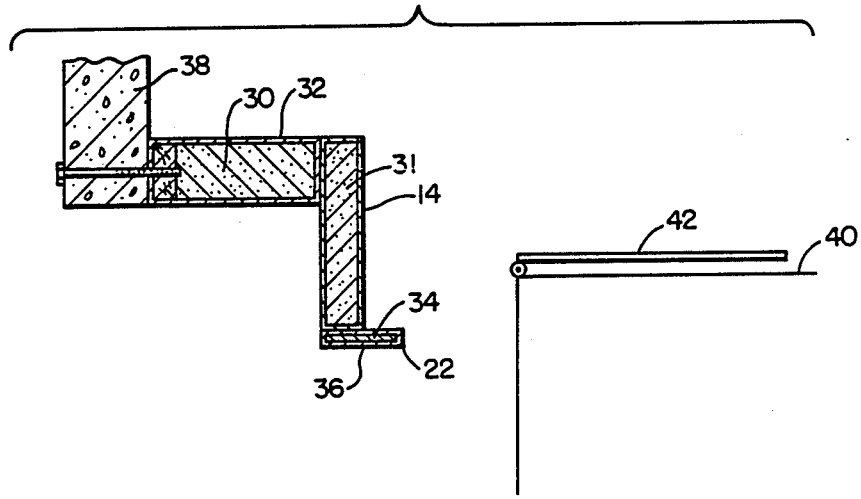
FIG. 2 is a view in horizontal section of a side of the dock seal position illustrated in FIG. 1 when not engaged by a truck.
Figure 3:
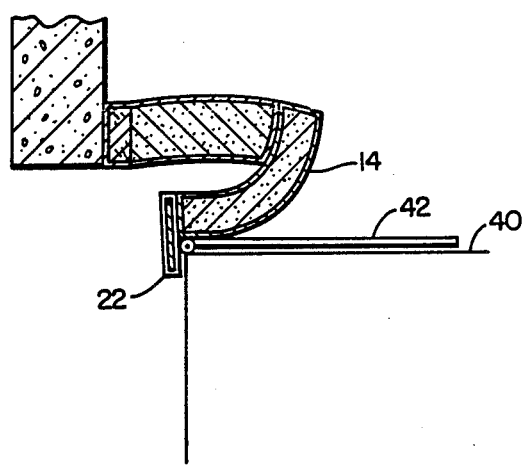
FIG. 3 is a view in horizontal section of the embodiment of FIG. 2, but showing a truck, backed into full engagement with the dock seal.

As shown in FIGS. 2 and 3 the preferred first and second legs of the movable panel each comprise a resilient foam core 30 and 31 covered with a protective sheet material 32. The lip panel 22 also comprises a central foam core 34 and a cover layer of protective sheet material 36. The entire unit is attached to a wall 38.

Also illustrated in FIGS. 2 and 3 is a segment of a truck 40 having doors, one door 42 of which is illustrated. In FIG. 2 the truck 40 does not engage the dock seal. However, as illustrated in FIG. 3, when the truck backs rearwardly and the exterior of the truck engages the dock seal, the movable panel 14, and similarly its symetrically opposite panel 16, are moved back toward the dock opening. As the flexible, movable panel 14 is bent and deformed rearwardly of the truck toward the dock opening, the lip panel 22 seats against the hinge gap of the door to extend the seal across that gap. Of course, as the truck is driven forwardly away from the dock opening, the dock seal will return to the position illustrated in FIG. 2.

Figure 6:
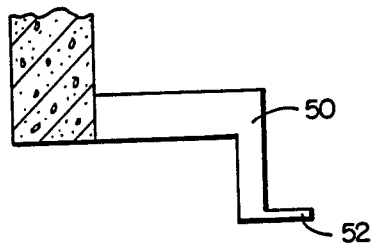
FIG. 6 is a view in horizontal section of another alternative embodiment of the invention.

There are, of course, many variations which can be made in the structure illustrated in FIGS. 1-3. For example, as illustrated in FIG. 6 the entire movable panel 50 and the lip panel 52, or any portion thereof, can be constructed to comprise a single unitary body.

Figure 4:
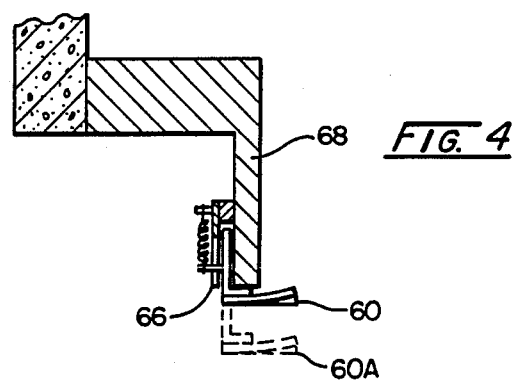
FIG. 4 is a view in horizontal section of an alternative embodiment of the invention.
Figure 5:
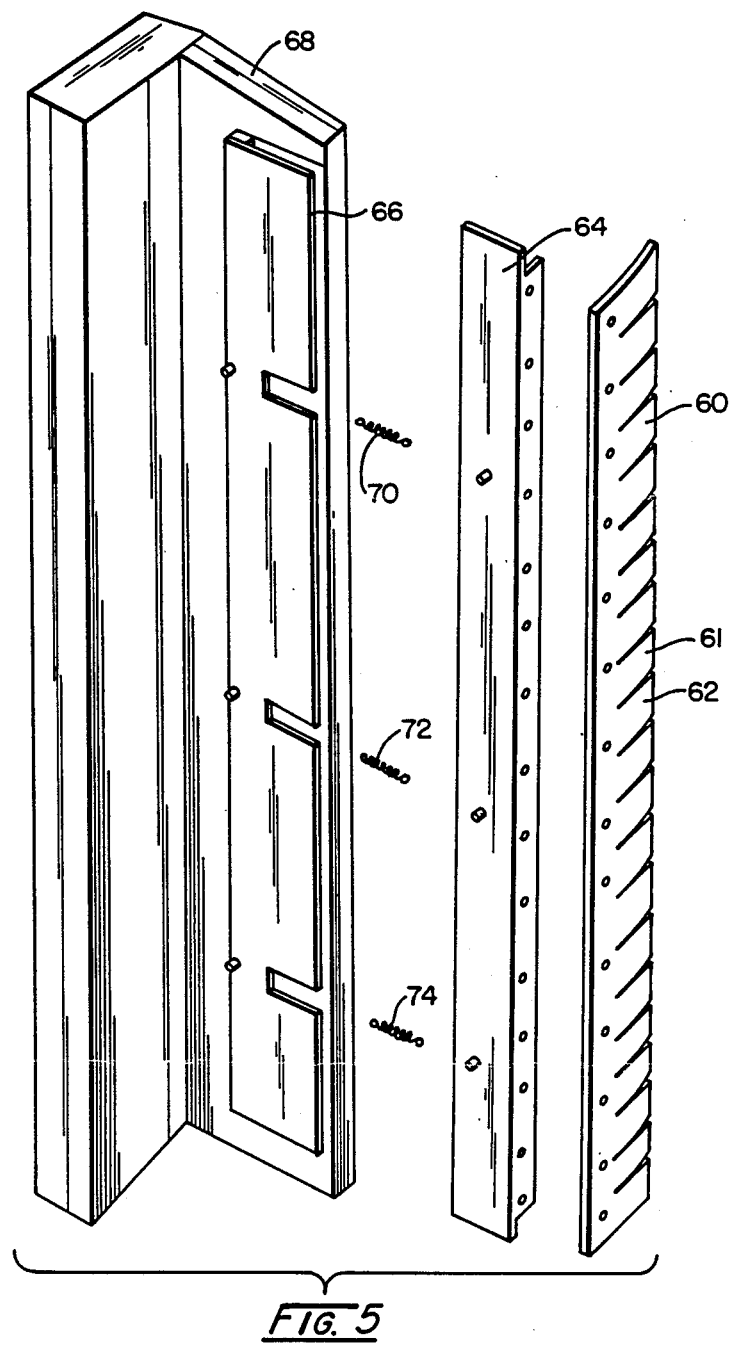
FIG. 5 is an exploded view illustrating in more detail the component parts of the embodiment illustrated in FIG. 4.

FIGS. 4 and 5 illustrate another alternative structure which may be utilized in embodiments of the present invention. For example, the lip panel 60 itself may be constructed as a series of contiguous segments, such as segments 61 and 62. These segments are contiguous to provide a relatively good seal between them, but allow a protruding hinge to deflect only segments in the region of the hinge and thus not deflect larger portions of the lip panel and open a leak. This provides a better seal against the changing contours at the region of the hinge gap.

In addition, the lip panel 60 may be attached to a slide 64 which preferably extends at right angles to the lip panel 60 into a mating slot 66 formed along the edge of the movable panel 68. The slot 66 slidably receives the slide 64. A plurality of springs 70, 72 and 74 are connected between the slide 64 and the movable panel to bias the slide into the slot. This results in the lip panel 60 being biased toward the movable panel 68. The lip panel 60 can slide out to position 60A shown in phantom in FIG. 4 but would, of course, do so under the force of the backing truck as shown in FIG. 3.

The biasing of the lip panel permits some further adjustment in the event that a truck does not back squarely against the bumper or bumper seal of the dock. Furthermore, the additional freedom of movement aids the dock seal to accomodate truck bodies of differing widths and yet seal all of them effectively.

Yet another alternative is that the movable side panels to which the lip is attached may consist of panels which are pivotally mounted to the sides of the dock opening to swing back about a vertical pivot axis when engaged by the exterior of a backing truck. Thus, the movement of the movable panel may be accomplished by mechanisms other than the flexure of a component.

While certain preferred embodiments of the present invention have been disclosed in detail, it is to be understood that various modifications may be adopted without departing from the spirit of the invention or scope of the following claims.

I claim:

1. An improved dock seal or shelter for sealing between a dock opening and a truck body and for sealing a space between an opened rear truck door and the door frame of the truck body, the seal being of the type having a movable panel which, in its disengaged position, extends generally toward the center of the dock opening and is movable back toward the opening upon engagement against the exterior of a truck, wherein the improvement comprises:

a generally vertically straight, elongated lip panel means attached to the movable panel near and running along its inner edge and, in said disengaged position, extending generally away from the dock opening, for being deflected into contacting and sealing engagement against the space between an opened truck door and the truck body by the movement of the truck body against the movable panel and the lip panel.

2. A dock seal in accordance with claim 1 wherein said movable panel is a flexible panel which has a leg extending outwardly generally perpendicularly of the opening and a second leg extending from the outer end of the first leg generally parallel to the plane of the opening toward its center and wherein said lip panel extends outwardly away from said second leg generally perpendicularly to the plane of said opening.

3. A dock seal in accordance with claim 2 wherein said legs and said lip panel each comprise a resilient foam core covered with a protective sheet material.

4. A dock seal in accordance with claim 3 wherein the foam core of said legs and said lip panel comprises a unitary body.

5. A dock seal in accordance with claim 1 wherein said lip panel comprises a series of contiguous segments.

6. A dock seal in accordance with claim 1 wherein said legs comprise a foam core and a protective sheet slipcover and said lip panel is attached to said slip cover.

7. A dock seal in accordance with claim 1 further comprising means for movably mounting the lip panel to said movable panel for limited movement toward and away from the movable panel and means for biasing said lip panel toward the movable panel.

8. A dock seal in accordance with claim 7 wherein said lip panel is attached to a slide at a right angle thereto wherein a mating slot is formed along the edge of the movable panel for receipt of the slide and wherein a plurality of springs are connected between the slide and the movable panel to bias the slide into the slot.

* * * * *